455-617 AU 233 EX

FIP8106 OR 3,900,404

United States Patent [19]

Dachs

[11] 3,900,404

[45] Aug. 19, 1975

[54] OPTICAL COMMUNICATION SYSTEM

[76] Inventor: Martin R. Dachs, 37 Pine St., New City, N.Y. 10596

[22] Filed: Aug. 2, 1973

[21] Appl. No.: 384,798

[52] U.S. Cl. .............................................. 250/199
[51] Int. Cl. .............................................. H04b 9/00
[58] Field of Search .............. 250/199; 315/DIG. 25, 315/209 CD

[56] References Cited

UNITED STATES PATENTS

| | | | |
|---|---|---|---|
| 2,389,649 | 11/1945 | Stark et al. | 250/199 |
| 3,050,630 | 8/1972 | Bird | 250/199 |
| 3,211,952 | 10/1965 | McMullen | 315/DIG. 5 |
| 3,444,544 | 5/1969 | Pearson et al. | 250/199 |
| 3,636,356 | 1/1972 | Glordmaine | 250/199 |
| 3,657,543 | 4/1972 | Rose | 250/199 |

*Primary Examiner*—Benedict V. Safourek
*Assistant Examiner*—Aristotelis M. Psitos
*Attorney, Agent, or Firm*—Ryder, McAulay, Fields, Fisher & Goldstein

[57] ABSTRACT

A fluorescent lamp light output is used as a carrier which is varied in intensity with an audio information signal. The current through the fluorescent lamp is varied not only by the audio information signal to be transmitted but also by a signal having an above audible frequency. This super-audio frequency signal stabilizers the fluorescent tube oscillations and thus prevents noise oscillations at audio frequencies. A line of sight receiver having a photo-electric transducer provides the audio signal output.

4 Claims, 3 Drawing Figures

OPTICAL COMMUNICATION SYSTEM

BACKGROUND OF THE INVENTION

This information relates in general to a means for communicating information through the variation in the light output of a fluorescent type lamp.

Conventions at which merchandise is displayed usually take place in large halls. This is one example of a situation in which short range communication is desired. Another example is in museums where a spoken description at an exhibit is often desired.

As a visitor or potential customer or other observer goes from exhibit to exhibit in a museum or convention, he is frequently supplied with some means for receiving a pre-prepared presentation of the various items on exhibit. Known types of devices include a portable tape recorder, a telephone type ear-set arrangement, and a head-phone recorder system. The tape recorder without an earphone provides too much background noise for many types of situations and can be an annoyance to others, particularly in crowded exhibitions. A phone type ear-set is too fixed to a particular location and also is limited in that one frequently has to queue up to use the fixed position phone.

The portable tape recorder with a head-phone is probably the best and most flexible known system. However, there is a real limitation in flexibility because once the tape is played past a certain point it cannot be replayed and if the user wishes to skip certain exhibits, he has to run the recorder through the description of those exhibits. Furthermore, the user has to proceed to the exhibits in a predetermined order.

Accordingly, the major purpose of this invention is to provide an improved system of the type described above in which each individual will carry his own receiver and which will provide the individual with the flexibility of selecting those exhibits that he wishes to have described or explained to him.

It is a further purpose to provide the individual with the option of determining the sequence of exhibits that he visits as well as the option of excluding those exhibits that he desires to exclude and the further option of returning to those exhibits where he wishes to hear the presentation more than once.

It is a further purpose of this invention to provide the above purposes in a mode that avoids bothering other visitors and yet avoids requiring visitors to que up at each exhibit.

It is a further purpose of this invention to provide the above purposes in a context of a lightweight receiver that is simple to maintain and operate.

SUMMARY OF THE INVENTION

In brief, this invention employs the light output of a fluorescent lamp as the carrier which is varied in intensity with the audio information signal. The modulated light falls on a photo-electric transducer to provide an audio signal at a line of sight receiver. The current through the fluorescent lamp is varied not only by the audio information signal but also by a signal having an above audible frequency. This super-audio frequency signal stabilizes fluorescent tube oscillations and thus prevents noise oscillations at audio frequencies.

DESCRIPTION OF THE PREFERRED EMBODIMENTS

Figure 1:
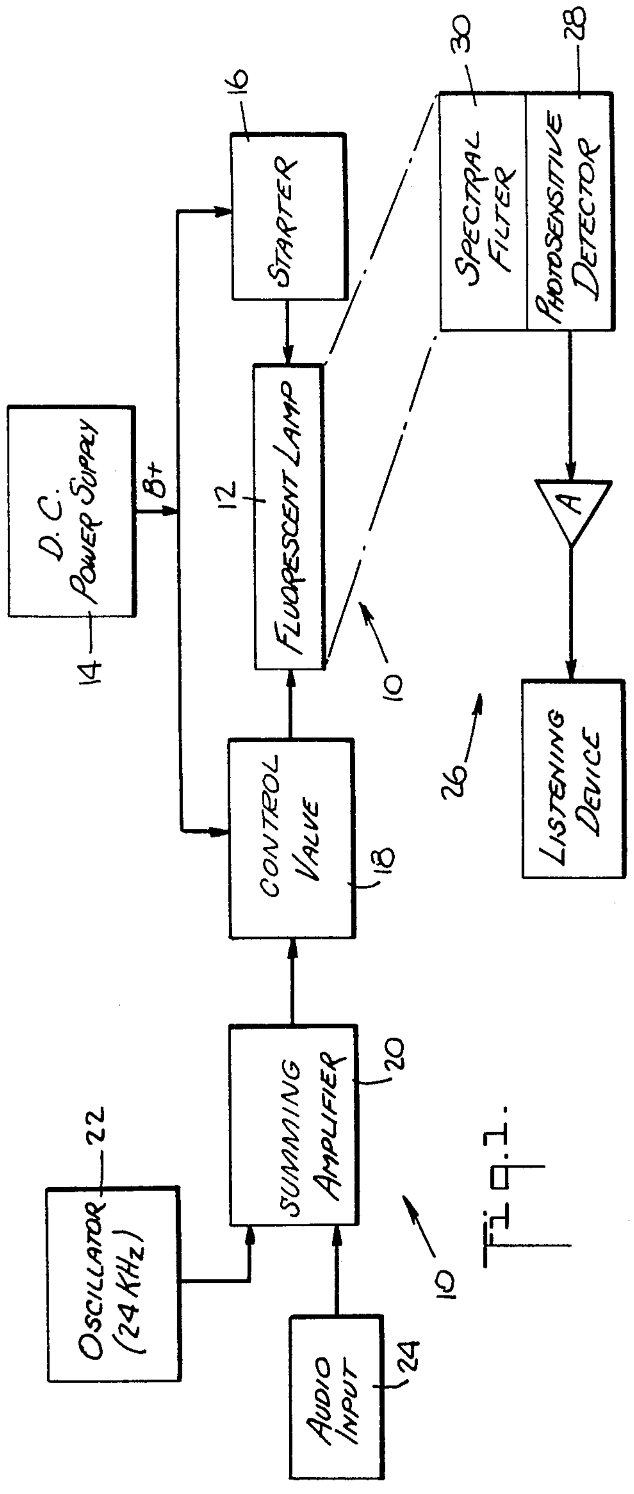
FIG. 1 is a block diagram of the system of this invention illustrating the major units in the transmitter and in the receiver.
Figure 2:
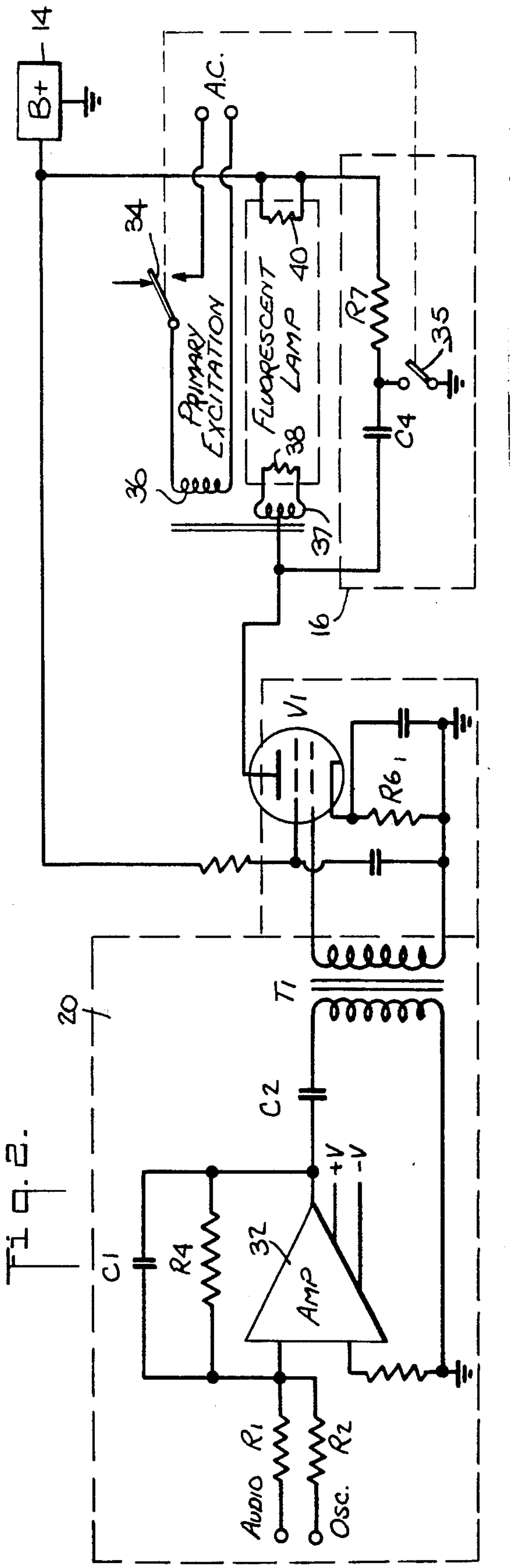
FIG. 2 is a schematic diagram of the transmitter of FIG. 1.
Figure 3:
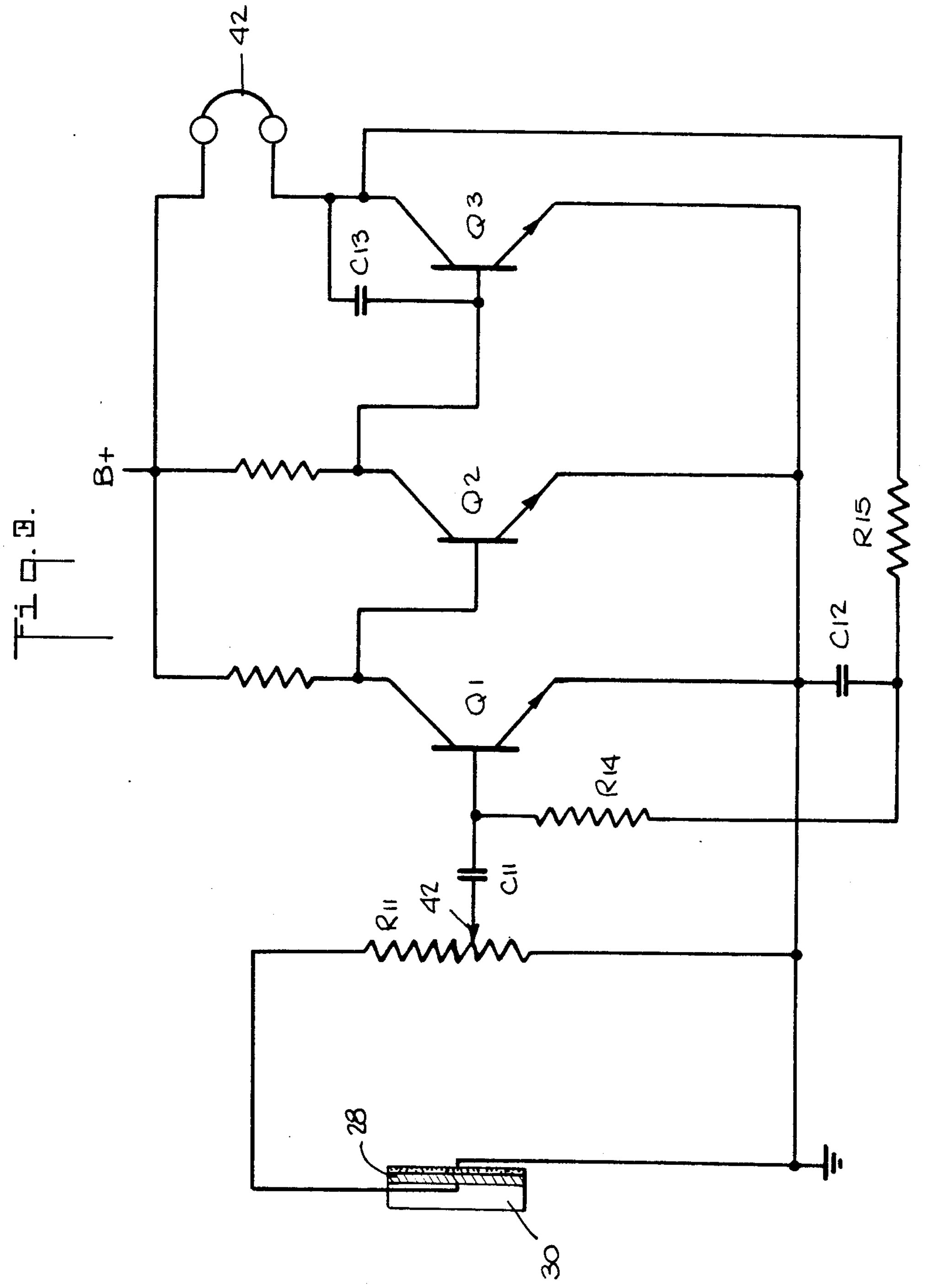
FIG. 3 is a schematic diagram of the receiver of FIG. 1.

FIGS. 1–3 represent a preferred embodiment of this invention. FIG. 1 broadly illustrates the arrangement of a system of this invention. As shown therein, the transmitter 10 includes a fluorescent lamp 12 which is energized by a DC power supply 14 and has associated with it a starting circuit 16. In series between the lamp 12 and power supply 14 is an electronic valve 18 such as an electron tube or transistor. This valve 18 performs the function of varying the current amplitude through the lamp 12. A summing amplifier 20 provides an input to the control valve 18. In this fashion the summing amplifier 20 output determines the amplitude of current flow through the lamp 12 and thus determines the magnitude of light output from the lamp 12. Specifically, as the summing amplifier 20 output varies, the impedence of valve 18 varies and the output light from lamp 12 varies.

The summing amplifier 20, in turn, simply combines a predetermined oscillator signal (24 Kilohertz in the embodiment shown) with an audio information signal. The oscillator 22 provides the predetermined oscillator signal and an audio input unit 24 provides the information signal.

The result is that the fluorescent lamp 12 will have an optical signal output that will be oscillating at the superaudible frequency provided by the oscillator 22 and will also be varying in accordance with the audio frequency signal provided by the audio input 24.

The lamp 12 output can be made quite directional, for example, by the use of louvers (not shown).

The receiver 26 includes a photosensitive detector 28 (see FIG. 3) that responds to optical input and provides a corresponding electrical output. A spectral filter 30 is positioned in front of the detector 28 in order to limit the amount of undesired background signal that might otherwise be picked up by the photo-detector. The photo-detector 28 is preferably responsive to wave lengths in the ultraviolet range as is the spectral filter 30. Thus, the only carrier wave length which is detected by the receiver is in the ultraviolet range. This is desirable because the typical incandescent bulb has negligible ultraviolet output and the typical fluorescent lamp has little ultraviolet output. Accordingly, the preferred fluorescent lamp employed in connection with this invention is one that is very rich in ultraviolet output.

This invention is intended to be used primarily in those situations where a repetitive and continuous message is provided. In situations, as in museums, this may be the entire message provided to the viewer. In other commercial situations, this may be a background information or message that supplements or can be supplemented by an on-hand salesman.

As shown in FIG. 2, the summing amplifier 20 includes an amplifier 32 and two input resistors R1, R2 for applying the audio signal and oscillator signal respectively to the input terminal of the amplifier 32. The feedback circuit R4, C1 determines the amplifier 32 band width. The output of the amplifier 32 is capacitively coupled, through capaciter C2, to an isolation transformer T1. The output from the transformer T1 is applied to the grid of an electron tube V1. The signal thus applied to the grid of electronic valve V1 is the sum of the audio signal it is desired to transmit and the superaudible oscillator signal. The resistor R6, the valve V1 and the fluorescent lamp 12 are all connected in series between input voltage B+ and ground. Thus, the current through the lamp 12 varies as a function of the sum of the audio and oscillator signals. As a consequence, the light output from the lamp 12 will vary as a function of the sum of these audio and oscillator signals.

The excitation voltage is a DC voltage B+.

A momentary starting switch has two contacts 34, 35. The contact 35 together with resistor R7 and capacitor C4 constitute the starter circuit 16. In order to start the lamp 12, the starting switch is momentarily closed thereby momentarily closing both contacts 34 and 35.

The momentary closing of contact 34 provides a pulse of alternating current through the transformer coupled windings 36, 37 across one filament 38 of the lamp 12 thus causing filament 38 to heat and glow.

The momentary closing of contact 35 causes the capacitor C4 to discharge through the valve V1. The capacitor C4 had been charged by the DC supply 14 through the circuit V1, R6, C4 and R7. Upon closing of the contact 35, the discharge through V1 and R6 creates a negative voltage pulse on the plate of the valve V1 which is applied to the filament 38 of the lamp 12.

The combination of the negative voltage pulse at the filament 38 and the positive B+ at the filament 40 provides a large starting voltage across the lamp 12 which, together with the initial heating of the filament 38, assures turn on of the lamp 12. In one embodiment, the power supply 14 was 300 volts DC and the closing of contact 35 provided approximately a 200 volt negative transient at the terminal 38, thereby providing a momentary 500 volt starting pulse across the lamp 12. The lamp 12 starts in a fraction of a second so that the switch contact 34, 35 may be momentary contacts. After the lamp 12 is lit, the starting circuit arrangement 34, 35, C4, R7 is not employed in the operation of the system.

The resistor R7 has a large resistance to minimize the audio shunting effect of capacitor C4.

The turning on of the lamp 12 completes the circuit through the valve V1 and resistor R6 thereby enabling the valve V1 to turn on. If there is no audio input the lamp 12 will pass a steady state DC current and provide a corresponding light output. The oscillator 22 output is then preferably adjusted so that the voltage swing across the lamp 12 is approximately one-half of the maximum possible excursion. This means that the current through the lamp 12 will be varied in accordance with the superaudible frequency of the oscillator. Even if the lamp output is light in the visible region, the 24KHz variation will not be visually perceived because the flicker frequency is too high.

When the audio signal is now added, the light output from the lamp 12 will vary at an audio rate. For reasonably linear operation, the current magnitude through the lamp should vary within the range from about zero to twice the steady state value since there is some 24KHz components and because of beat frequency components, it is important that this oscillator frequency be superaudible. More importantly, the significance of the oscillator frequency is that it forces the lamp 12 to oscillate at the superaudible frequency and thus prevents the lamp 12 from oscillating at some audio frequency which would add audio noise to the variation of the light output. These fluorescent lamps tend to oscillate at frequencies that are determined by the electrical parameters of the lamp and associated circuitry. Thus, the existance of the 24KHz frequency prevents unwanted audio signals (i.e. noise) due to uncontrolled lamp oscillation.

Twenty-four KHz is the presently preferred frequency although both higher and lower frequencies could be used as the oscillator frequency. Lower frequencies are less preferred because the beat frequencies produced by the inter-reaction of the audio and oscillator signals might then be sufficiently low to be heard. A practical limitation on the upper frequency is related to the electrical parameters of the lamp 12 and distributed capacity in the cables and wiring.

The lamp 12 illustrated has a filament 38, 40, on each end. This is a convenient arrangement because the lamp 12 is operated on direct current and thus there will be a migration of mercury within the lamp necessitating a reversal of the polarity across the lamp at periodic intervals.

With reference to FIG. 3, the spectral filter 30 has the function of reducing unwanted signals that might be produced by lighting devices such as incandescent or fluorescent lamps. Such devices have little or no untraviolet output and thus a spectral filter that passes only ultraviolet light will serve to transmit only the output from the preferred fluorescent tube 12. In one embodiment, the filter employed to pass ultraviolet light was Corning Glass type 5840. This filter has a maximum transmission at approximately 350 nanometers and falls towards zero transmission at 410 nanometers.

The photoelectric cell 18 itself responds to the input ultraviolet light to provide an electrical output that is a function of the magnitude of input ultraviolet light. In one embodiment the photoelectric transducer was a selenium photocell which was manufactured to have an enhanced untraviolet sensitivity and virtually no response in the infrared region.

The output of the transducer 28 is developed across the resistor R11. A potentiometer pickup 42 provides an adjustable volume control feature. The signal picked up at 42 is coupled across the capacitor C11 to the base of a transistor Q1. The amplified signal at the collector of Q1 is coupled directly to the base of second transistor Q2 and there further amplified as as output on the collector of the transistor Q2 to be directly coupled to the base of the third transistor Q3. The earphone 43 serves as the load impedance for the transistor Q3 and is connected to the collector of the transistor Q3 as shown.

The resistors R14 and R15 and the capacitor C12 provides a negative feedback network that serves to determine the correct operating point for the transistors and provides the time constant consistant with bandwidth requirements. Capacitor C13 is a fixed capacitor selected to yield the desired tone effect for the earphone 43.

What is claimed is:

1. The transmitter of an optical communication system comprising:

a fluorescent lamp, audio signal means to provide an audio frequency signal for conveying whatever audio communication is to be transmitted, oscillator means to provide a super audible frequency signal, a summing amplifier coupled to said audio signal and to said super audible signal to provide a sum signal, and a control valve responsive to said sum signal and coupled to said fluorescent lamp, to vary the current through said fluorescent lamp as a function of said sum signal, said fluorescent lamp providing a light output varying in intensity as a function of said audio signal.

2. The transmitter of claim 1 further comprising:

a momentary starting switch having first and second normally open contacts, a starting circuit including a resistor and capacitor in series across said lamp, said capacitor being connected to a first terminal of said lamp, means to charge said capacitor, said first contact connected to discharge said capacitor upon actuation of said switch to provide a momentary pulse at said first terminal of said lamp, a transformer having a secondary connected across the filament at said first terminal of said lamp and a primary connected through said second contact of said switch to provide a pulse of heating current upon actuation of said switch.

3. An optical communication system comprising:

a fluorescent lamp, audio signal means to provide an audio frequency signal for conveying whatever audio communication is to be transmitted, oscillator means to provide a super audible frequency signal, a summing amplifier coupled to said audio signal and to said super audible signal to provide a sum signal, a control valve responsive to said sum signal and coupled to said fluorescent lamp, to vary the current through said fluorescent lamp as a function of said sum signal, said fluorescent lamp providing a light output varying in intensity as a function of said audio signal, a photo-electric transducer optically coupled to said light output from said fluorescent lamp, an optical filter at the optical input to said transducer, an audio amplifier coupled to the output of said transducer, and an earphone coupled to the output of the audio amplifier, the response characteristics of said transducer causing the output of said transducer to track with the audio frequency variation of the light input to said transducer, said response characteristic being the sole demodulation characteristic provide within said receiver, said audio amplifier causing the earphone to track the audio frequency variation of light input to said transducer enabling the message to be heard, said optical filter having an attenuation characteristic that substantially cuts out light having wavelengths longer than the ultraviolet.

4. The optical communication system of claim 3 further comprising:

a momentary starting switch having first and second normally open contacts, a starting circuit including a resistor and capacitor in series across said lamp, said capacitor being connected to a first terminal of said lamp, means to charge said capacitor, said first contact connected to discharge said capacitor upon actuation of said switch to provide a momentary pulse at said first terminal of said lamp, a transformer having a secondary connected across the filament at said first terminal of said lamp and a primary connected through said second contact of said switch to provide a pulse of heating current upon actuation of said switch.

* * * * *

UNITED STATES PATENT OFFICE
CERTIFICATE OF CORRECTION

PATENT NO. : 3,900,404
DATED : August 19, 1975
INVENTOR(S) : Martin R. Dachs

It is certified that error appears in the above-identified patent and that said Letters Patent are hereby corrected as shown below:

Col. 3, line 47, change "contact" to --contacts--

Col. 4, line 43, change "18" to -- 28 --.

Col. 4, line 55, delete second "as"

Col. 1, line 51, change "que" to queue--

Col. 4, line 34-35, change "untraviolet" to --untraviolet--

Col. 4, line 47, change "untraviolet" to --ultraviolet--

Signed and Sealed this

*twenty-fourth* Day of *February 1976*

[SEAL]

*Attest:*

RUTH C. MASON
*Attesting Officer*

C. MARSHALL DANN
*Commissioner of Patents and Trademarks*